(12) United States Patent
Ramler et al.

(10) Patent No.: US 8,521,389 B2
(45) Date of Patent: Aug. 27, 2013

(54) SPRING BRAKE VALVE

(75) Inventors: Travis G Ramler, Elyria, OH (US);
Richard J. Conklin, Bay Village, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 13/561,323

(22) Filed: Jul. 30, 2012

(65) Prior Publication Data
US 2012/0285565 A1 Nov. 15, 2012

Related U.S. Application Data

(63) Continuation of application No. 12/260,638, filed on Oct. 29, 2008, now Pat. No. 8,249,789.

(51) Int. Cl.
*B60T 13/62* (2006.01)

(52) U.S. Cl.
USPC .......... 701/70; 701/71; 701/76; 303/7; 303/64

(58) Field of Classification Search
USPC ............... 701/70, 71, 76; 303/7, 64
See application file for complete search history.

(56) References Cited

U.S. PATENT DOCUMENTS

| | | | | |
|---|---|---|---|---|
| 3,892,444 A * | 7/1975 | Durling | ................. | 303/13 |
| 3,909,069 A * | 9/1975 | Durling | ................. | 303/9 |
| 4,330,157 A * | 5/1982 | Sebo | ................. | 303/7 |
| 4,472,001 A * | 9/1984 | Fannin | ................. | 303/9 |
| 4,629,256 A * | 12/1986 | Fannin | ................. | 303/8 |
| 5,046,786 A * | 9/1991 | Johnston et al. | ................. | 303/7 |
| 5,061,015 A * | 10/1991 | Cramer et al. | ................. | 303/7 |
| 5,226,692 A * | 7/1993 | Eberling | ................. | 303/8 |
| 5,236,250 A * | 8/1993 | Moody et al. | ................. | 303/7 |
| 5,251,967 A * | 10/1993 | Eberling | ................. | 303/7 |
| 5,284,384 A * | 2/1994 | Herring | ................. | 303/28 |
| 5,322,353 A * | 6/1994 | Wallestad | ................. | 303/7 |
| 5,340,212 A * | 8/1994 | Latvala | ................. | 303/7 |
| 5,417,479 A * | 5/1995 | Wallestad et al. | ................. | 303/7 |
| 5,425,571 A * | 6/1995 | Wallestad et al. | ................. | 303/7 |
| 5,458,403 A * | 10/1995 | Moody | ................. | 303/7 |
| 5,466,053 A * | 11/1995 | Koelzer | ................. | 303/7 |
| 5,511,860 A * | 4/1996 | Wallestad et al. | ................. | 303/7 |
| 5,553,928 A * | 9/1996 | Hart et al. | ................. | 303/7 |
| 6,062,652 A * | 5/2000 | Eberling | ................. | 303/7 |
| 6,655,750 B2 * | 12/2003 | Soupal | ................. | 303/9 |
| 6,682,459 B1 * | 1/2004 | Knight | ................. | 477/183 |
| 7,073,873 B2 * | 7/2006 | Kemer | ................. | 303/7 |
| 7,309,111 B2 * | 12/2007 | Herges et al. | ................. | 303/7 |
| 2004/0012249 A1 * | 1/2004 | Koelzer | ................. | 303/3 |

* cited by examiner

*Primary Examiner* — Kevin Hurley
*Assistant Examiner* — Michael Stabley
(74) *Attorney, Agent, or Firm* — Eugene E. Clair; Cheryl L. Greenly

(57) ABSTRACT

Methods and valve arrangements for controlling the flow of pressurized air from a tractor to a trailer reservoir and to a trailer spring brake chamber. In one exemplary embodiment, pressurized air from a tractor is supplied from a tractor to the trailer reservoir and to the trailer spring brake in different filling modes based on a user input. In another exemplary embodiment, pressurized service air is used to charge or partially charge the trailer reservoir.

12 Claims, 13 Drawing Sheets

SPRING BRAKE VALVE

CROSS REFERENCE TO RELATED APPLICATIONS

This application is a continuation of U.S. patent application Ser. No. 12/260,638 entitled "Spring Brake Valve" filed Oct. 29, 2008, now U.S. Pat. No. 8,249,789, the entire disclosure of which is incorporated fully herein by reference.

FIELD OF THE INVENTION

The invention relates to the art of vehicle braking systems and finds particular application in heavy trucks, tractors, and busses.

BACKGROUND OF THE INVENTION

Commercial vehicles, such as for example tractor trailers, often utilize air brake systems. A typical air brake system is capable of performing a service brake function and a park brake function. Service braking or normal braking refers to actuating the vehicle's brakes by depressing a brake pedal to deliver compressed air to a brake actuator. Service braking is used to slow the vehicle or bring the vehicle to a stop. Once stopped, the driver may wish to apply the park brakes to prevent the vehicle from rolling. Typical vehicle air brake systems utilize spring brake chambers to perform the park brake function. Spring brake chambers utilize spring force to engage the brakes and hold the vehicle stationary. Air pressure is used to disengage the brakes by compressing the spring.

Referring to FIG. 1, tractors typically include a compressor 10 that provides the compressed air used to operate the tractor's brakes, as well as a trailer's brakes. The compressor provides compressed air to one or more reservoirs 12 on the tractor. When a brake pedal 14 is depressed, the brakes (not shown) on the tractor are engaged. In addition, depressing the brake pedal sends pressurized air over a service line 16 to the trailer to engage the brakes 17 (FIG. 2) of the trailer. This pressurized air is referred to as pressurized service air in this application. The tractor also includes a trailer supply valve 18. The trailer supply valve 18 selectively provides air from the tractor to the trailer over a supply line 20. This pressurized air is referred to in this application as pressurized supply air.

Referring to FIGS. 1 and 2, when the trailer supply valve 18 is in a first state (typically a depressed actuator 19), pressurized supply air is applied over the supply line 20 to the trailer. The pressurized supply air is routed by a spring brake valve 21 to fill spring brake chambers 22 to release the spring brake and fills trailer reservoirs 24 with pressurized air. When the supply valve is in a second state (typically a pulled-out actuator 19), the supply of pressurized supply air to the trailer is cut off and the spring brake valve 21 and/or the trailer supply valve 18 vents the spring brake chambers to apply the spring brakes.

When the brake pedal 14 is depressed, pressurized service air is communicated to a relay valve 26. The relay valve, in turn, supplies pressurized air to service brake chambers 30 to engage the brakes. When the brake pedal 14 is released, the relay valve 26 exhausts the service brake chambers 30 to release the brakes.

Existing spring brake valves 21 are typically configured operate in only a single mode where priority is given either to the service brake (i.e. fill the reservoir before releasing the spring brake) or to the spring brake (i.e. releasing the spring brake before the reservoirs are filled to a normal operating pressure).

SUMMARY

The present application discloses various embodiments of methods, valve arrangements, and fluid circuits for controlling the flow of pressurized air from a tractor to a trailer reservoir and to a trailer spring brake chamber. In one exemplary embodiment, pressurized air from a tractor is supplied from a tractor to the trailer reservoir and to the trailer spring brake in different filling modes based on a user input. In another exemplary embodiment, pressurized service air is used to charge or partially charge the trailer reservoir.

BRIEF DESCRIPTION OF THE DRAWINGS

In the accompanying drawings which are incorporated in and constitute part of the specification, embodiments of the invention are illustrated, which, together with a general description of the invention given above, and the detailed description given below, serve to exemplify the embodiments of this invention.

Further advantages and benefits will become apparent to those skilled in the art after considering the following description and appended claims in conjunction with the accompanying drawings.

DETAILED DESCRIPTION OF EXEMPLARY EMBODIMENTS

While the inventions are described herein with specific reference to a variety of exemplary structural and material features, such descriptions are intended to be exemplary in nature and should not be construed in a limiting sense. Further, while various aspects of the invention are described and illustrated herein as embodied in combination in the exemplary embodiments, these various aspects may be realized in many alternative embodiments, either individually or in various combinations and sub-combinations thereof. Unless expressly excluded herein all such combinations and sub-combinations are intended to be within the scope of the present invention. Still further, while various alternative embodiments as to the various aspects and features of the invention, such as alternative valves, materials, structures, configurations, methods, devices, software, hardware, control logic and so on may be described herein, such descriptions are not intended to be a complete or exhaustive list of available alternative embodiments, whether presently known or later developed. Those skilled in the art may readily adopt one or more of the aspects, concepts or features of the invention into additional embodiments within the scope of the present invention even if such embodiments are not expressly disclosed herein. Additionally, even though some features, concepts or aspects of the invention may be described herein as being a preferred arrangement or method, such description is not intended to suggest that such feature is required or necessary unless expressly so stated. Still further, exemplary or representative values and ranges may be included to assist in understanding the present invention however, such values and ranges are not to be construed in a limiting sense and are intended to be critical values or ranges only if so expressly stated.

Figure 3:
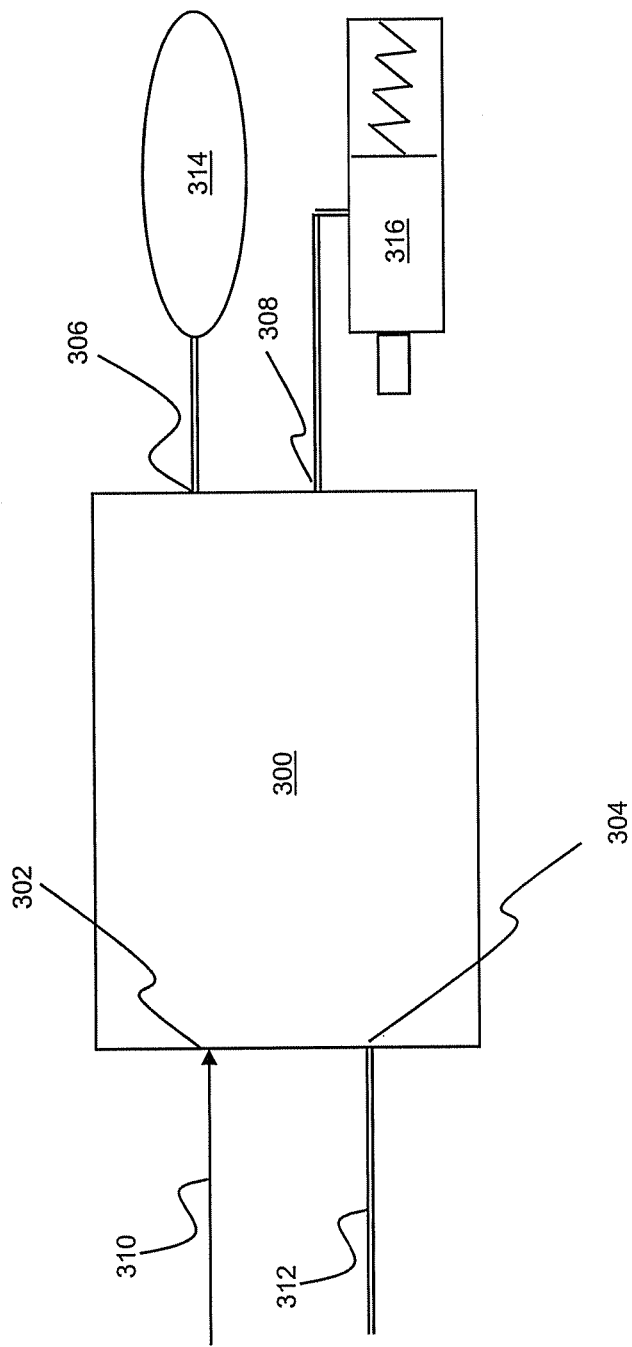
FIG. 3 is a schematic illustration of a trailer spring brake valve.

FIG. 3 is a schematic illustration of a trailer spring valve assembly 300 that includes a port 302, a fluid inlet 304, a reservoir outlet 306, and a spring brake outlet 308. The port 302 is adapted to receive a user input 310 from the operator of a tractor. The user input 310 may take a wide variety of different forms. Examples of user inputs 310 include, but are not limited to, air pressure signals, hydraulic pressure signals, electrical signals, wireless signals, any combination of these signals, and the like. The driver may input the user input in a wide variety of different ways. Examples of user interfaces that allow a user to provide the user input include, but are not limited to, switches and valve actuators, keypads, touch screens, buttons, levers, etc. Any user interface may be used. In one exemplary embodiment, the user input 310 is the communication of pressurized service air from the tractor to the trailer spring valve assembly 300 that results when the brake pedal of the tractor is depressed and the trailer supply valve 18 is opened (See FIG. 1). In another embodiment, the user input is a hand operated control device located in the tractor. The hand operated control device may take the form of any of the user interfaces described above. For example, the hand operated control device may be a valve or an electrical device, such as a switch, that controls a solenoid valve. The hand operated control device may be separate from the trailer supply valve 18 or the trailer supply valve 18 may be modified to provide the user input. The user input 310 can be any signal that communicates a decision of the driver to the trailer spring valve.

The fluid inlet 304 receives pressurized air 312 from the tractor. The pressurized air 312 may be pressurized service air and/or pressurized supply air from the tractor, for example. The reservoir outlet 306 is in fluid communication with a reservoir 314 of the trailer and the spring brake outlet 308 is in fluid communication with a spring brake chamber 316 of a trailer brake. In an exemplary embodiment, the user input 310 represents one of two or more filling modes for the spring brake chamber 316 and the reservoir 314. A wide variety of different filling modes may be defined by trailer spring valve assembly 300. The trailer spring valve assembly 300 may be configured to allow two, three, or any number of filling modes to be selected by providing different user inputs. For example, the trailer spring valve may be configured to allow two or more of the following filling modes to be selected by the user. Examples of such filling modes include, but are not limited to: applying pressure only to the spring brake chamber before any pressure is applied to the reservoir; applying pressure to the spring brake chamber and the reservoir such that the spring brake is released before the reservoir reaches a normal operating pressure; applying pressure to the spring brake chamber and the reservoir such that the spring brake is not released until the reservoir reaches a normal operating pressure; simultaneous application of pressure to the spring brake chamber and the reservoir; applying supply pressure only to the spring brake chamber before any supply pressure is applied to the reservoir; applying supply pressure to the spring brake chamber and the reservoir such that the spring brake is released before the reservoir reaches a normal operating pressure; applying supply pressure to the spring brake chamber and the reservoir such that the spring brake is not released until the reservoir reaches a normal operating pressure; applying supply pressure to the spring brake chamber and applying service pressure to the reservoir; applying supply pressure to the reservoir and applying service pressure to the service brake chamber; applying supply pressure to the spring brake chamber and applying service pressure to the reservoir while ensuring that the spring brake is released before reservoir reaches a normal operating pressure; applying supply pressure to the spring brake chamber and applying service pressure to the reservoir while ensuring that the spring brake is not released before reservoir reaches a normal operating pressure; applying supply pressure to the reservoir and applying service pressure to the service brake chamber while ensuring that the spring brake is released before reservoir reaches a normal operating pressure; applying supply pressure to the reservoir and applying service pressure to the service brake chamber while ensuring that the spring brake is not released before reservoir reaches a normal operating pressure; applying supply pressure to the spring brake chamber and applying service pressure to the reservoir until the pressure at the spring brake chamber reaches a threshold pressure; applying supply pressure to the reservoir and applying service pressure to the service brake chamber until the pressure in the reservoir reaches a threshold pressure; etc.

In one exemplary embodiment, the normal operating pressure is any pressure that allows the service brakes to be applied. This pressure can vary based on the size of the vehicle and/or the size and configuration of the service brake chamber. In one exemplary embodiment, the normal operating pressure is above the pressure required to release the spring brakes. For example, the pressure required to release the spring brakes may by 70 psi and the normal operating pressure may be 85 psi and above. In one exemplary embodiment, the upper end of the normal operating pressure range is 150 psi.

Once the filling mode is selected, the pressurized air supplied by the tractor is routed by the trailer valve assembly 300 to the trailer spring brake chamber and the trailer reservoir in accordance with the selected filling mode.

Figure 4:
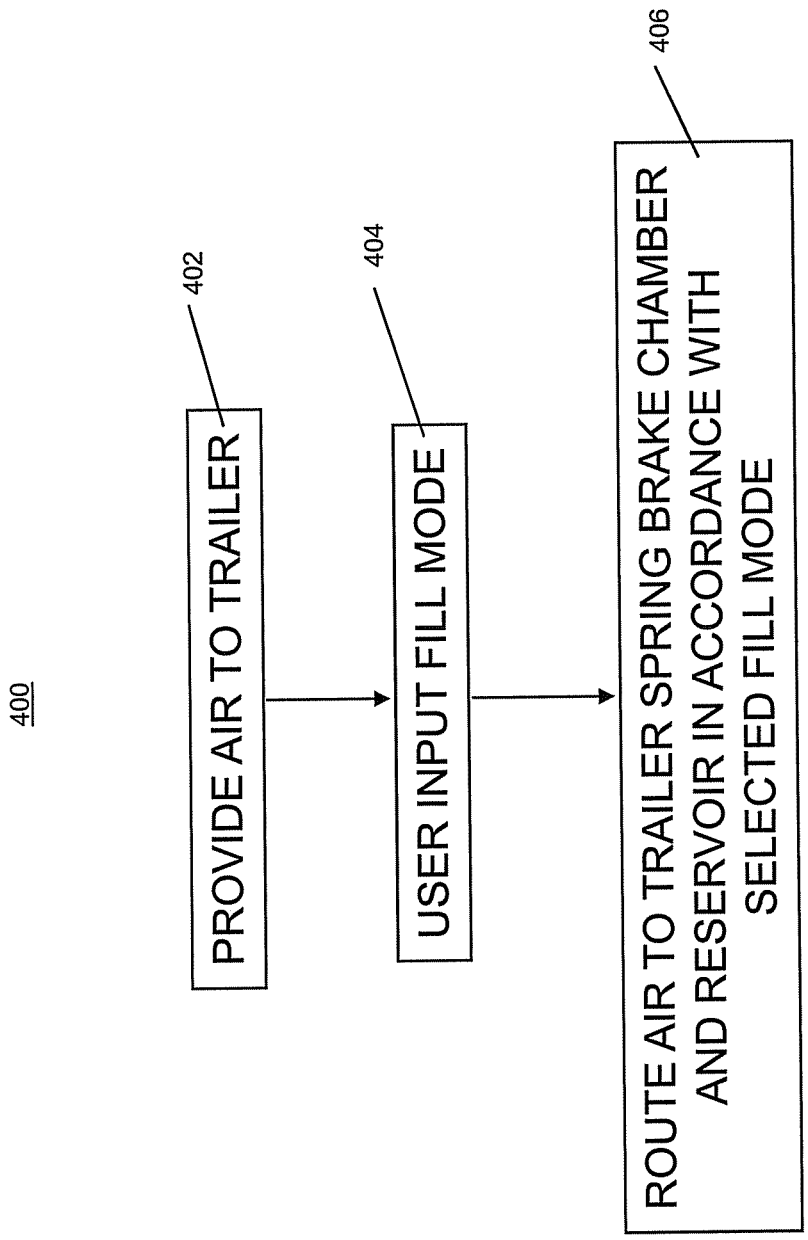
FIG. 4 is a flowchart that illustrates a method of routing pressurized air to a trailer spring brake chamber and to a trailer reservoir.

FIG. 4 is a flow chart that illustrates a method 400 that may be practiced by using the trailer valve assembly 300. However, the method 400 can also be practiced using other arrangements. In the method, pressurized air is provided 402 to a trailer brake system. The user inputs or selects 404 a desired fill mode. Pressurized air is then routed 406 to the spring brake chamber and the reservoir in accordance with the selected fill mode.

Figure 5:
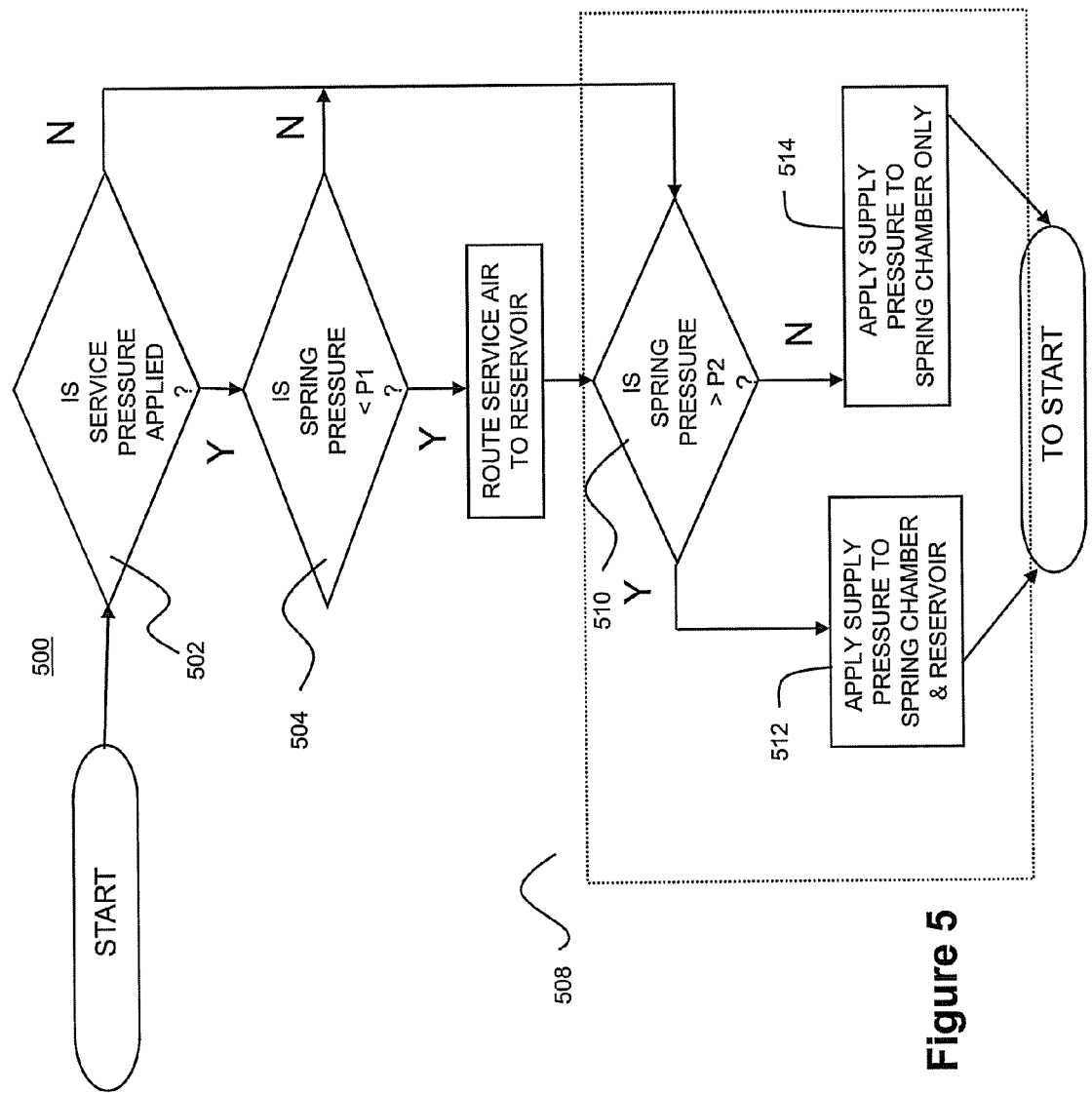
FIG. 5 is a flowchart that illustrates a method of routing pressurized air to a trailer spring brake chamber and to a trailer reservoir.

FIG. 5 is a flow chart that illustrates another exemplary method 500 of filling a chamber of a trailer spring brake and a trailer reservoir with air supplied by a tractor. The method determines 502 whether pressurized service air is applied to the trailer brake system. This can be done simply by pressing and releasing the brake pedal of the tractor. If the brake pedal is pressed, pressurized service air is applied and if the brake pedal is not depressed, the pressurized service air is not applied. If the pressurized service air is applied, the method determines 504 whether a pressure of the air in the spring brake chamber is below a threshold pressure value P1. If the pressurized service air is applied and the pressure of the air in the spring brake chamber is below the threshold pressure value P1, the method routes pressurized service air to the trailer reservoir to begin filling or pre-charge the reservoir. In an exemplary embodiment, the predetermined threshold value P1 is less than the pressure required to release spring brakes. As a result, pressurized service air would only be used to pre-charge the reservoir while the spring brakes are still engaged. For example, if the pressure required to release the spring brakes were about 70 psi, the predetermined threshold value P1 could be any value below 70 psi, such as 50 psi for example. If the pressurized service air is not applied and/or the pressure of the air in the spring brake chamber is above the threshold pressure value P1, then the method may block the flow of pressurized service air to the reservoir and the method proceeds to a routine 508 that fills the spring brake chamber and the reservoir with pressurized supply air. The routine 508 can take a wide variety of different forms. For example, the routine 508 can give priority to the spring brake chamber or the reservoir. In the example illustrated by FIG. 5, the method determines 510 whether the pressure of the air in the spring brake chamber is above a predetermined threshold value P2. If the pressure of the air in the spring brake chamber is below the predetermined threshold value P2, the pressurized supply air is applied 512 to the spring brake chamber only. If the pressure of the air in the spring brake chamber is above the predetermined threshold value P2, the pressurized supply air is applied 514 to the spring brake chamber an the reservoir. In an exemplary embodiment, the predetermined threshold value P1 is greater than the pressure required to release spring brakes. As a result, pressurized supply air would only begin to fill the reservoir after the spring brakes are released. For example, if the pressure required to release the spring brakes were about 70 psi, the predetermined threshold value P2 could be any value above 70 psi, such as 85 psi for example, without diverting pressurized supply air to fill the reservoir until the spring brake is released.

Figure 6:
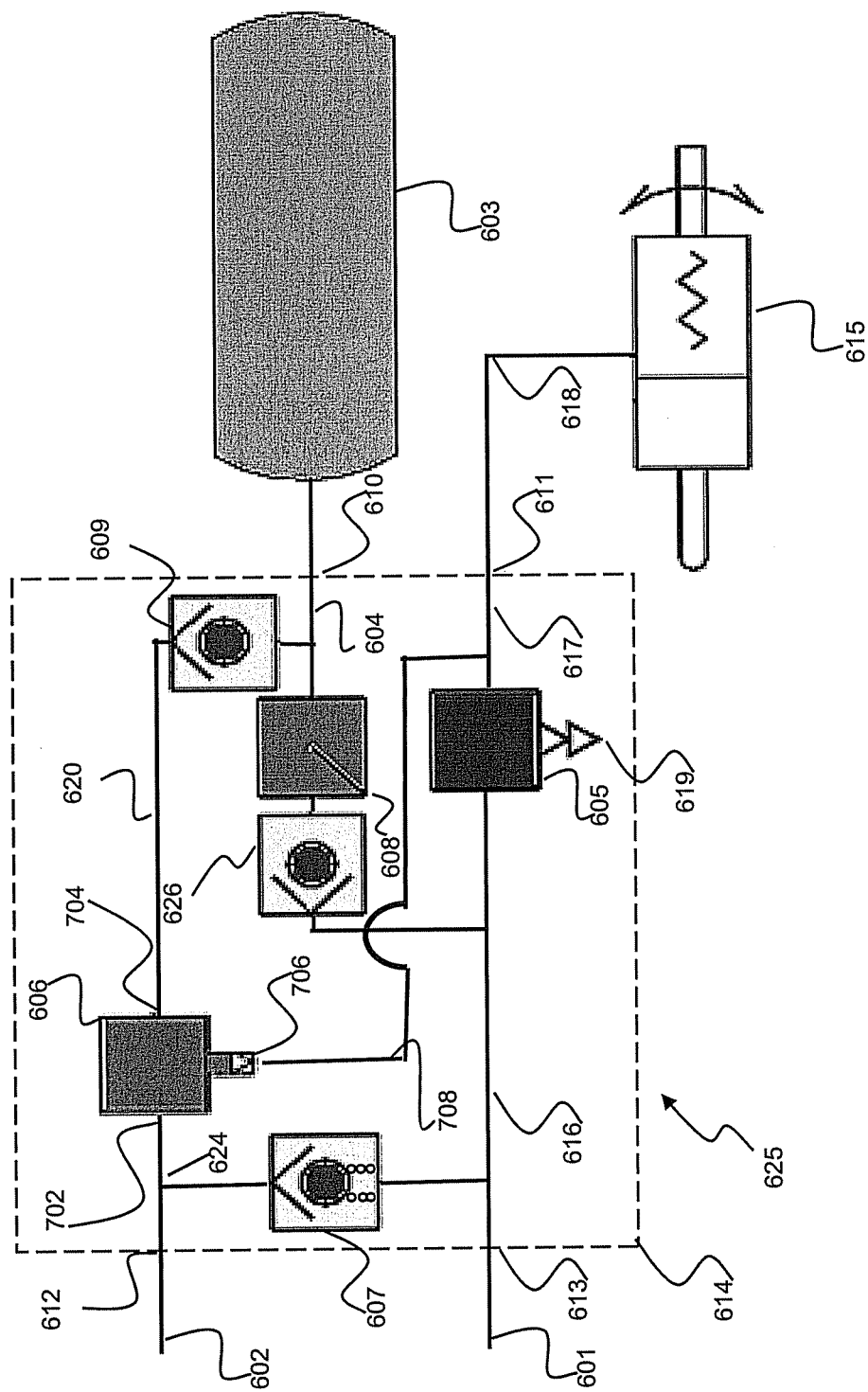
FIG. 6 is a schematic illustration of a fluid circuit of a trailer air brake system.

The method illustrated by the flow chart of FIG. 5 can be practiced by a variety of different physical arrangements. For example, the method may be performed by an arrangement of discrete valves, may be performed by a unitary valve assembly that performs multiple valve functions, may be performed by electrically controlled valves, etc. FIG. 6 is a schematic illustration of one exemplary embodiment of a fluid circuit 625 that can be used to perform the method of FIG. 5. In the embodiment illustrated by FIG. 6, the functional components of the fluid circuit 625 are housed in a single valve body or housing 614. However, in another embodiment the fluid circuit 625 may be formed by discrete components that are positioned at various locations on the trailer.

In the example illustrated by FIG. 6, the valve body or housing 614 has a service line inlet 612 or port configured to be coupled to the pressurized service line 602 of a tractor, a supply line inlet or port 613 configured to be coupled to a pressurized supply line 601 of the tractor, a reservoir outlet 610 or port configured to be coupled to a trailer reservoir 603, and a spring brake outlet 611 or port configured to be coupled to a spring brake chamber 615. A plurality of valves are disposed in the valve body 614 to control the flow of pressurized service air to the reservoir 603 and pressurized supply air to the spring brake chamber 615 and to the reservoir 603. A variety of different types and arrangements of valves can be used.

A check valve 607 is disposed in the valve body or housing 614. The check valve 607 is in fluid communication with a passage 616 from the supply port 613 and a passage 624 from the service port 612. A quick release valve cluster 605 is disposed in the valve body or housing 614. The quick release valve cluster 605 is in fluid communication with the passage 616 from the supply port 613 and a passage 617 to the spring brake port 611. The quick release valve cluster 605 is operable to selectively connect to the passage 617 or to atmosphere 619 depending on the pressure conditions in the chamber 616. The quick release valve 605 may take a variety of different forms. One acceptable quick release valve 605 is a QRV quick release valve, Available from Bendix Commercial Vehicle Systems LLC.

The valve housing 614 also contains a pressure protection cluster with a check valve 626 and pressure protection valve 608 in fluid communication with the passage 616. In one embodiment, the check valve 626 is mechanically coupled to the pressure protection valve 608. At a predetermined setting, the pressure protection valve 608 will also be in fluid communication with chamber a passage 604 that leads to the reservoir outlet 610. The pressure protection valve 608 may take a variety of different forms. One acceptable pressure protection valve is a PR-4™ pressure protection valve, Available from Bendix Commercial Vehicle Systems LLC.

A selectable inversion valve cluster 606 is included in the fluid circuit 625 to allow the circuit switch between two modes of operation. In the illustrated embodiment, in one mode pressurized service air is routed to the reservoir 603 and in a second mode pressurized service air is blocked from the reservoir by the inversion valve cluster. The inversion valve cluster 606 has a fluid inlet 702 that is in fluid communication with a passage 624 that leads to the service line inlet 612 and a fluid outlet 704 that is in fluid communication with a passage 620 that is in fluid communication with a passage 620 that leads to the reservoir outlet 610 through a check valve 609. The inversion valve cluster 606 has an input 706 that is switched based on pressure in a passage 708 between the input 706 and the passage 617 to the spring brake chamber 615. When the pressure in the spring brake chamber 615 is below the predetermined threshold pressure P1, the inversion valve cluster opens to allow fluid flow between the passage 624 and the passage 620. When the pressure in the spring brake chamber 615 is above the predetermined threshold pressure P1, the inversion valve cluster closes to block fluid flow between the passage 624 and the passage 620. The inversion valve cluster 606 may take a variety of different forms. One acceptable inversion valve cluster 606 is TR-3™ parking brake control valve, Available from Bendix Commercial Vehicle Systems LLC. Check valves 609 and 626 trap air in the trailer reservoir 603 during normal and un-coupling operations.

Figure 7:
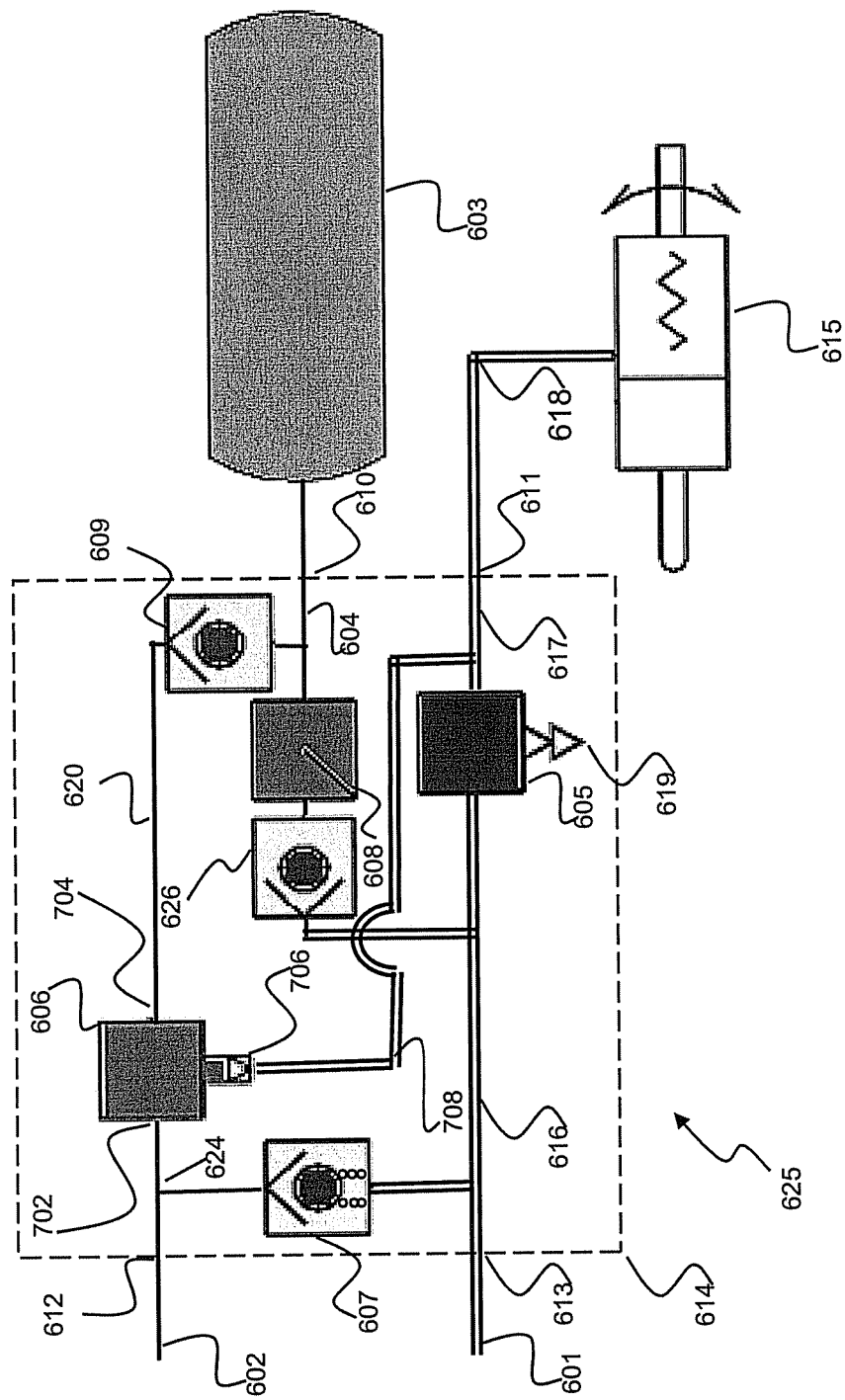
FIG. 7 illustrates the fluid circuit of FIG. 6 where pressurized supply air is supplied to the trailer air brake system at a pressure that is below a predetermined threshold value P2 and pressurized service air is not applied to the trailer air brake system.

FIGS. 7-13 illustrate operation of the fluid circuit 625. In the Figures, the passages illustrated by double lines ===== represent passages that are filled with pressurized supply air and passages illustrated by triple lines ===== represent passages that are filled with pressurized service air. In FIG. 7, pressurized supply air is supplied to the supply inlet or port 613 and pressurized service air is not supplied to the service inlet or port service port 612. For example, referring to FIG. 1, the trailer supply valve 18 is positioned to provide the pressurized supply air to the trailer and the brake pedal 14 is not depressed. This setting of the trailer supply valve 18 and the brake pedal may be selected when the driver would like to quickly pull the tractor trailer away. In FIG. 7, the pressurized supply air ===== is at a pressure that is below the predetermined pressure P2. In the embodiment illustrated by FIG. 7, the predetermined pressure P2 is the pressure needed to open the check valve 626 and the pressure protection valve 608. Any check valve can be selected to set the predetermined pressure P2. The pressurized supply air applied to the supply port 613 is directed through the passage 616 to the quick release valve cluster 605 and to the spring brake chamber 615. This releases the spring brakes through line 618. The pressurized supply air cannot communicate with the passage 604 or the passage 624, because the check valves 626 and 607 are closed. The exhaust 619 of the quick release valve cluster 605 is closed and passage 708 is charged with the pressurized supply air ===== from the passage 617 to provide the pressurized supply air to the input 706 of the inversion valve cluster 606. In one embodiment, the service brakes may not be available because the reservoir has no air if the predetermined pressure P2 is greater than the pressure required to release the spring brakes. The driver can pull away once the predetermined pressure, such as 70 psi, is achieved in the spring brakes.

Figure 8:
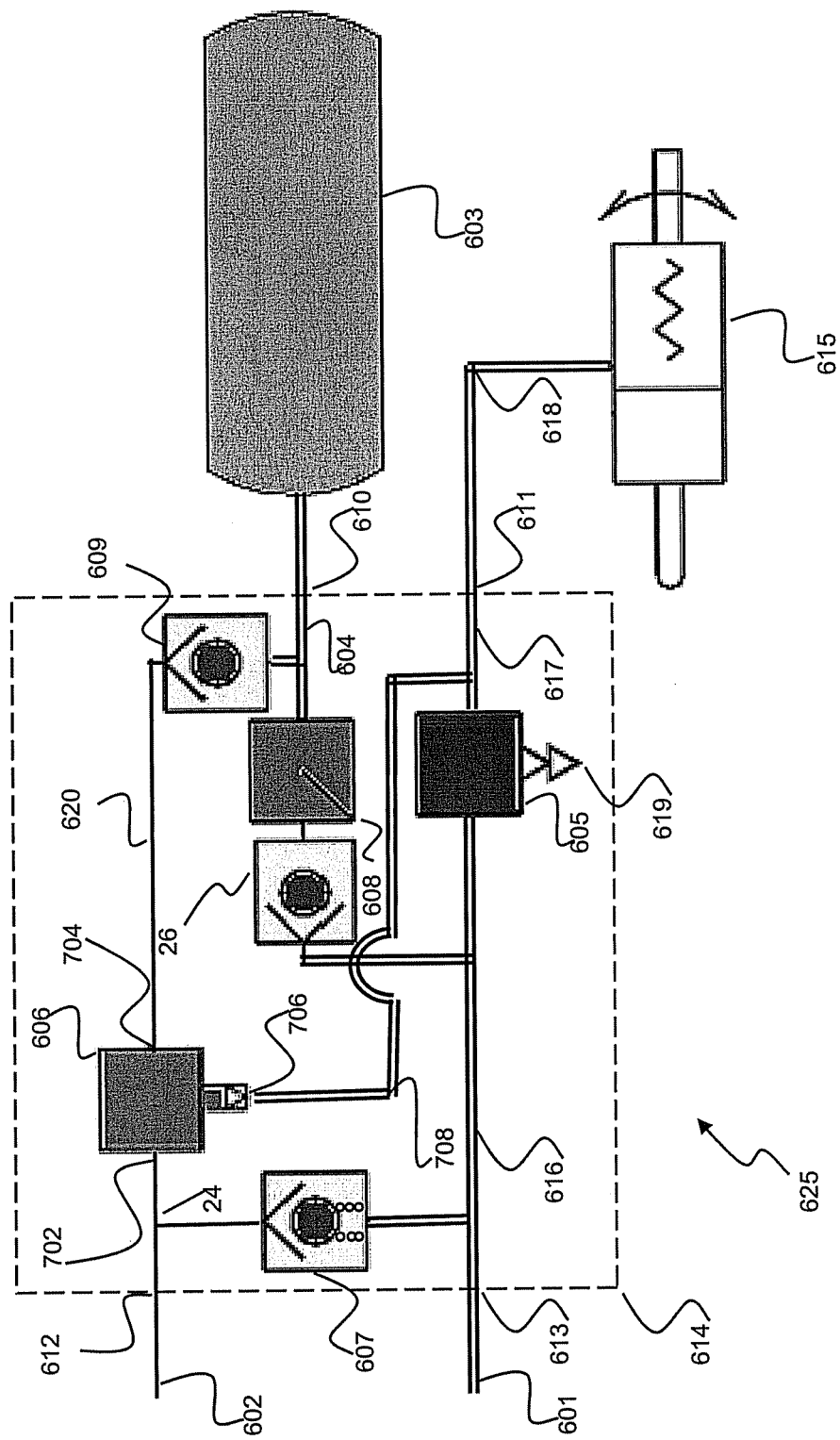
FIG. 8 illustrates the fluid circuit of FIG. 6 where pressurized supply air is supplied to the trailer air brake system at a pressure that is above the predetermined threshold value P2 and pressurized service air is not applied to the trailer air brake system.

Referring to FIG. 8, when the pressure from the pressurized supply air ===== reaches or exceeds the predetermined pressure P2, the check valve 626 opens and the pressurized supply air ===== begins to fill the reservoir 603 through the pressure protection valve 608. The circuit 625 is now charging the spring brake chamber(s) 615 and the reservoir 603 with pressurized supply air ===== from supply line 601. Charging of the reservoir 603 and the spring brake chamber(s) 615 will continue until full system pressure is achieved.

Figure 9:
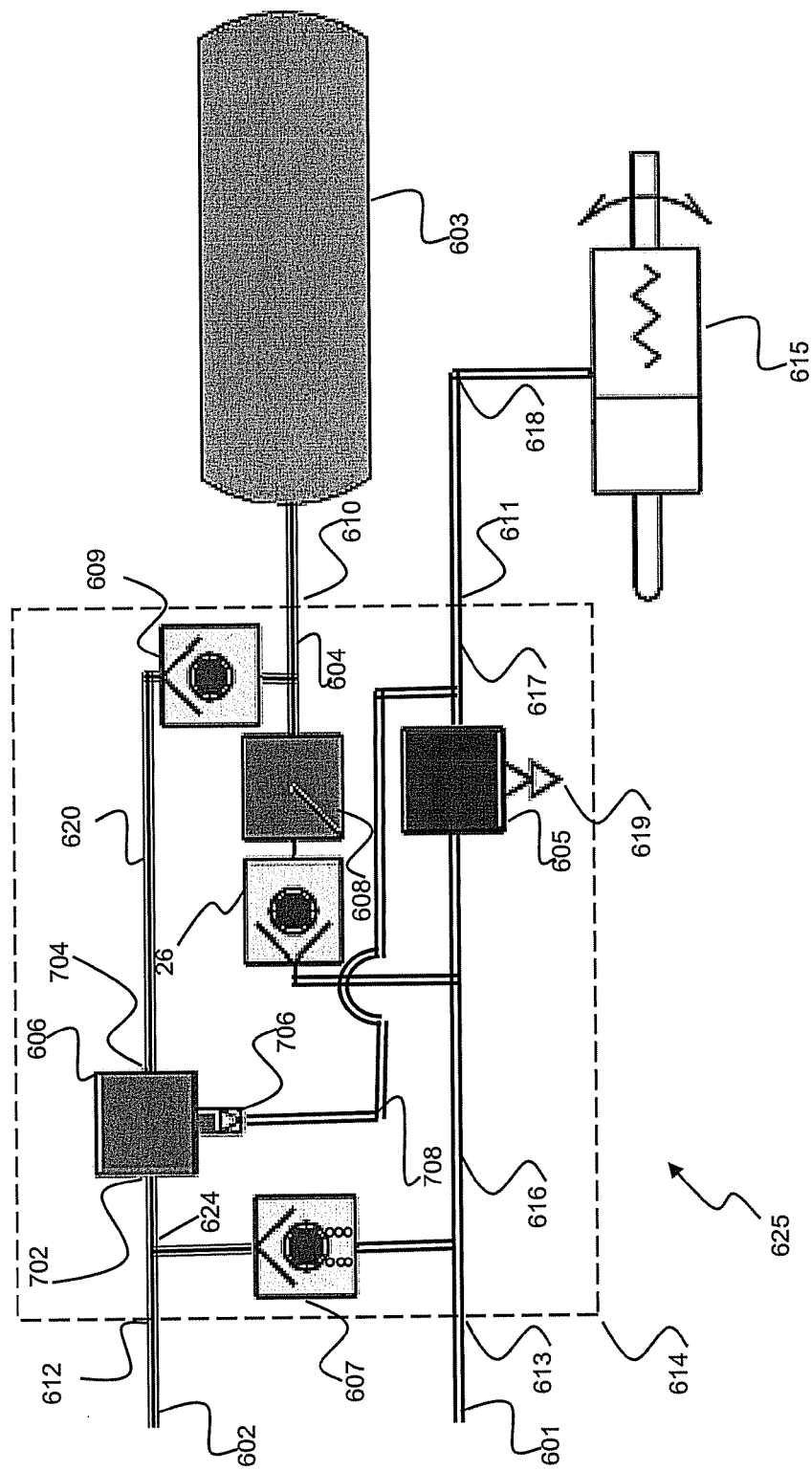
FIG. 9 illustrates the fluid circuit of FIG. 6 where pressurized supply air is supplied to the trailer air brake system at a pressure that is below a predetermined threshold value P1 and pressurized service air is applied to the trailer air brake system.

FIG. 9 illustrates the fluid circuit 625 when pressurized supply air is supplied to the supply inlet or port 613 and pressurized service air is also supplied to the service inlet or port service port 612. For example, referring to FIG. 1, the trailer supply valve 18 is positioned (typically pressed in) to provide the pressurized supply air to the trailer and the brake pedal 14 is depressed. This setting of the trailer supply valve 18 and the brake pedal 14 may be selected when the driver would like to charge the reservoir 603 with pressurized service air ===== at the same time the spring brake chamber(s) 615 are being filled with pressurized supply air =====. This allows the operator of the vehicle to fast charge the reservoir 603 before pulling away. Pressurized supply air ===== from the supply line 601 will fill the spring brakes 615 via the passage 616, valve cluster 605, passage 617, port 611, and line 618. In FIG. 9, the pressure of the pressurized supply air ===== in the passage 708 applied to the input 706 of the inversion valve cluster 606 is below the predetermined pressure P1. When the pressurized supply air ===== applied to the input 706 is below the predetermined pressure P1, the inversion valve cluster 606 is open. For example, the predetermined pressure P1 may be approximately 50 psi. Pressurized service air ===== from the service line 602 will fill the reservoir 603 via the passage 624, the normally open inversion valve 606, the chamber 620, check valve 609, passage 604, and reservoir port 610. In a simultaneous fashion, fast reservoir fill and service brake priority has been achieved. Since dual lines are feeding the circuit, the time to pull away is decreased for a service brake air available pull away.

Figure 10:
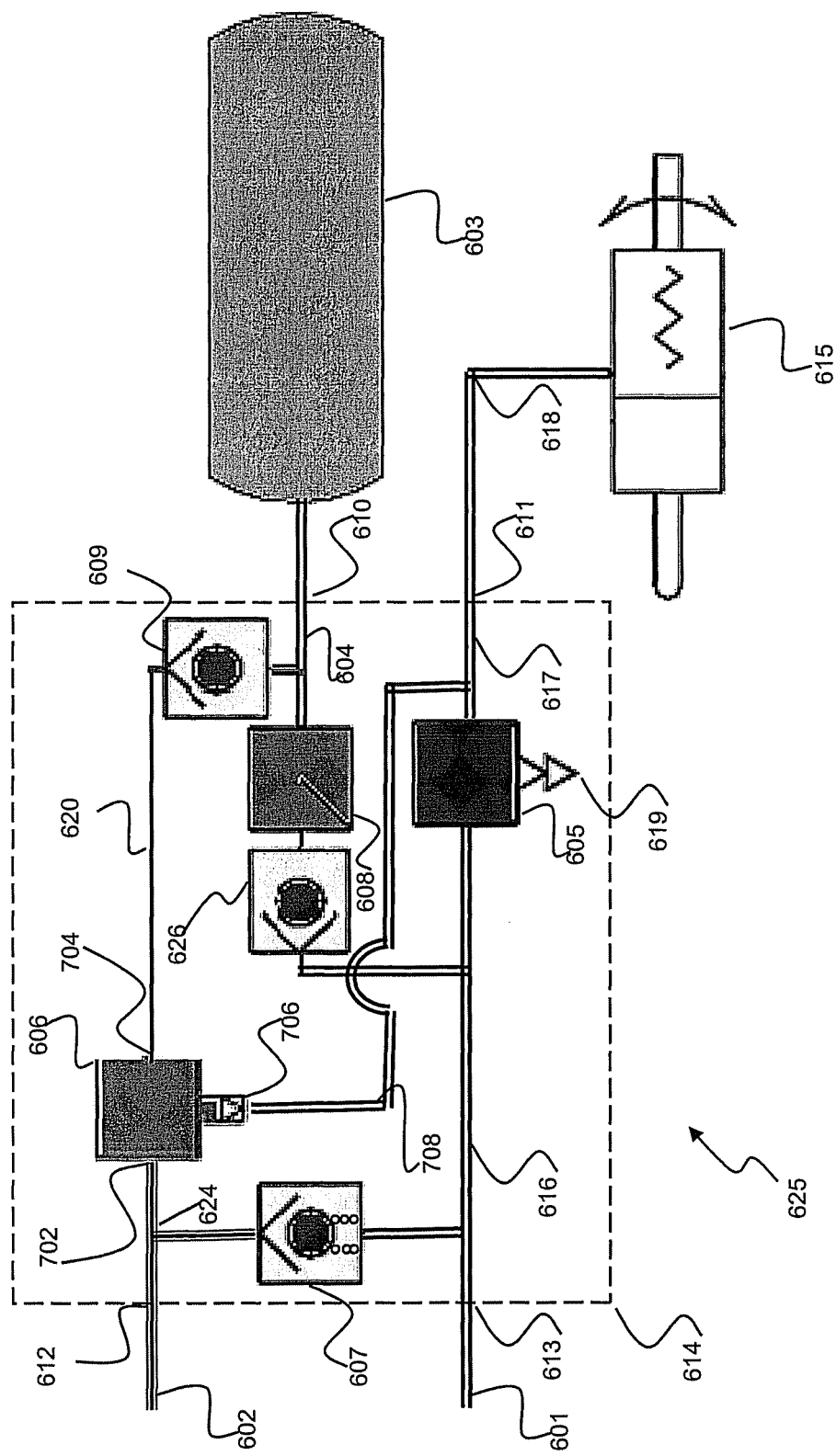
FIG. 10 illustrates the fluid circuit of FIG. 6 where pressurized supply air is supplied to the trailer air brake system at a pressure that is above the predetermined threshold value P1 and pressurized service air is not applied to the trailer air brake system.

FIG. 10 illustrates the fluid circuit 625 when pressurized supply air is supplied to the supply inlet or port 613 and pressurized service air is also supplied to the service inlet or port service port 612, but the pressure of the pressurized supply air ===== applied to the input 706 of the inversion valve cluster 606 is at or above the predetermined pressure P1. When the pressurized supply air ===== applied to the input 706 is at or above the predetermined pressure P1, the inversion valve cluster 606 is closed. As a result, pressurized service air ===== from the service line 602 will no longer fill the reservoir 603. The pressurized supply air ===== will continue to charge the spring brakes 615 or the spring brakes and the reservoir 603 in the same manner as described with respect to FIGS. 7 and 8, depending on whether the pressure of the pressurized supply air ===== is above or below the predetermined pressure P2. The spring brakes 615 will be released when the predetermined pressure P2 is reached. Air trapped in the reservoir 603 is available for service braking.

Figure 11:
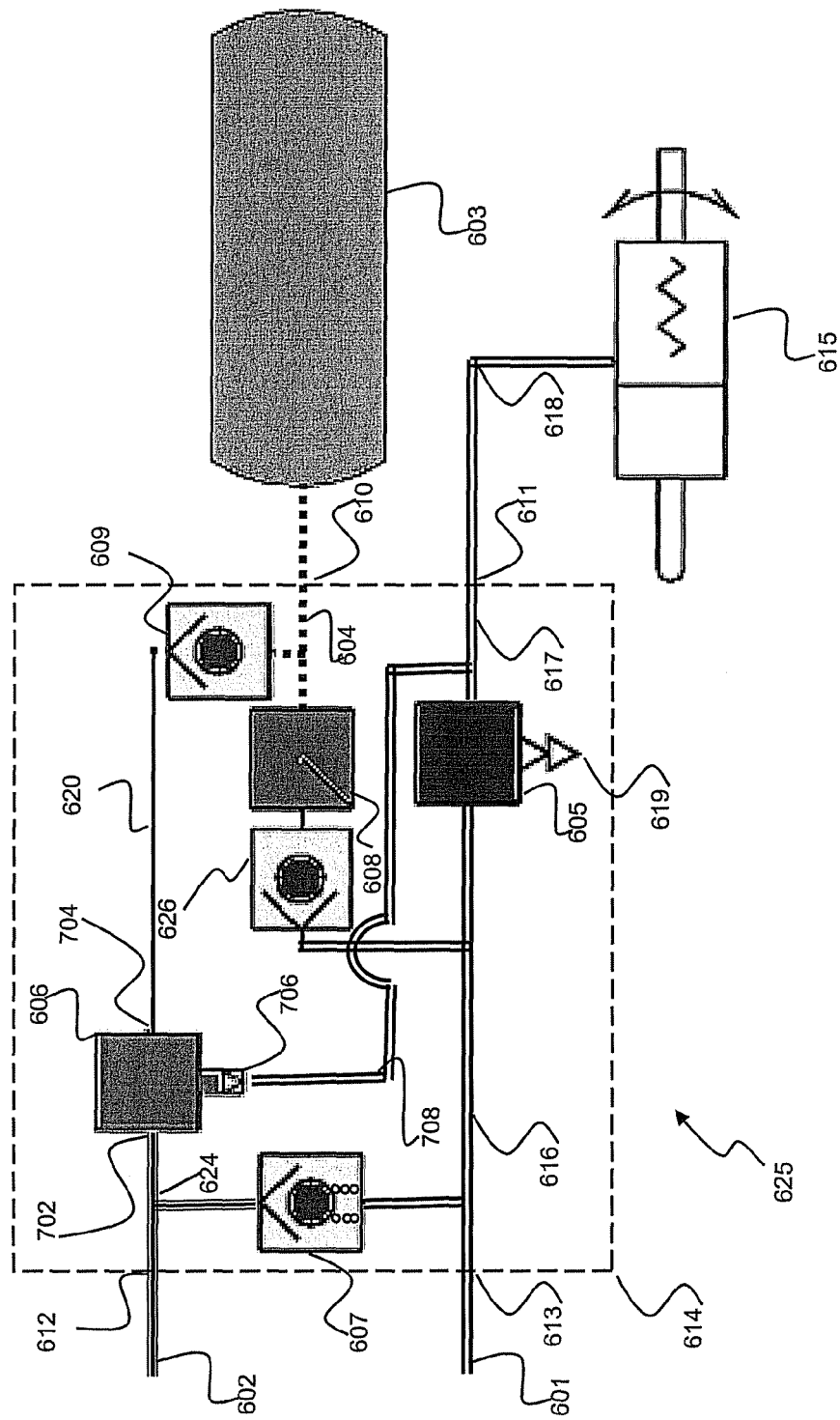
FIG. 11 illustrates the fluid circuit of FIG. 6 where pressurized supply air is supplied to the trailer air brake system, pressurized service air is applied to the trailer air brake system, and the reservoir has failed.

FIG. 11 illustrates operation of the fluid circuit 625 when the reservoir 603 fails, for example leaks. The dashed line ········ in FIG. 11 represents an empty or substantially empty passage or air line due to a loss in air pressure due to a leak of the reservoir 603 or a line that leads to or from the reservoir. The fluid circuit protects the pressurized service line 602 and the pressurized supply line 601 in the event of a leak of the reservoir 603. If the reservoir 603 fails, the pressure protection valve 608 will close at the predetermined pressure P2, for example 70 psi, and protect the supply line 601. In the exemplary embodiment, of FIG. 11, since the pressure in the passage 617 is protected to the predetermined pressure P2 and the predetermined pressure P2 is greater than the predetermined pressure P1 required to open the inversion valve cluster 606, the service air line will also be protected. For example, the predetermined pressure P1 may be approximately 50 psi. and the inversion valve cluster 606 will not open when the reservoir fails, because the check valve 626 maintains 70 psi on the input 706 to keep the inversion valve cluster 606 closed when the reservoir fails.

Figure 1:
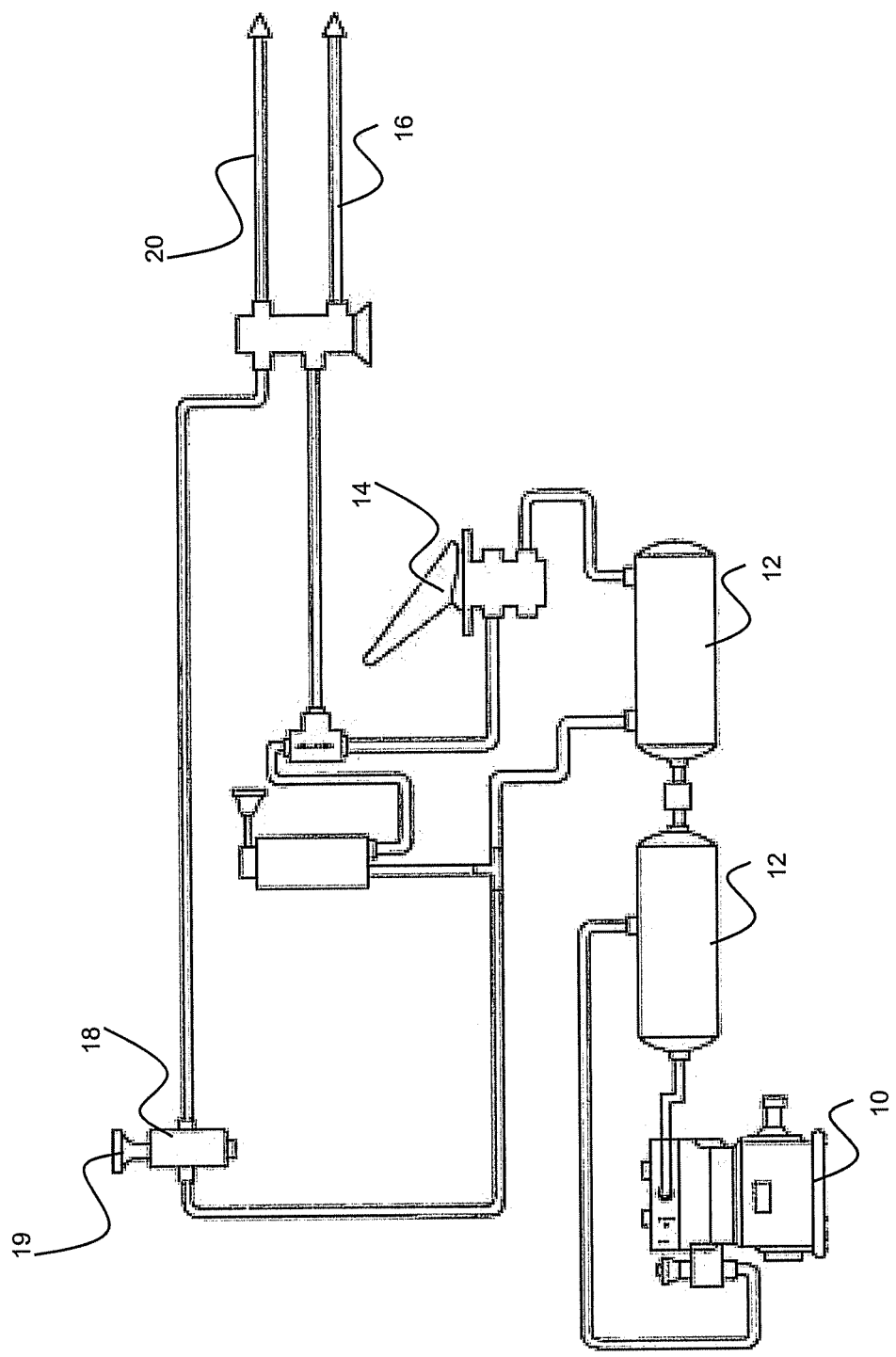
FIG. 1 is a schematic illustration of a prior art fluid circuit of a tractor that supplies pressurized service air and pressurized supply air to a trailer.
Figure 2:
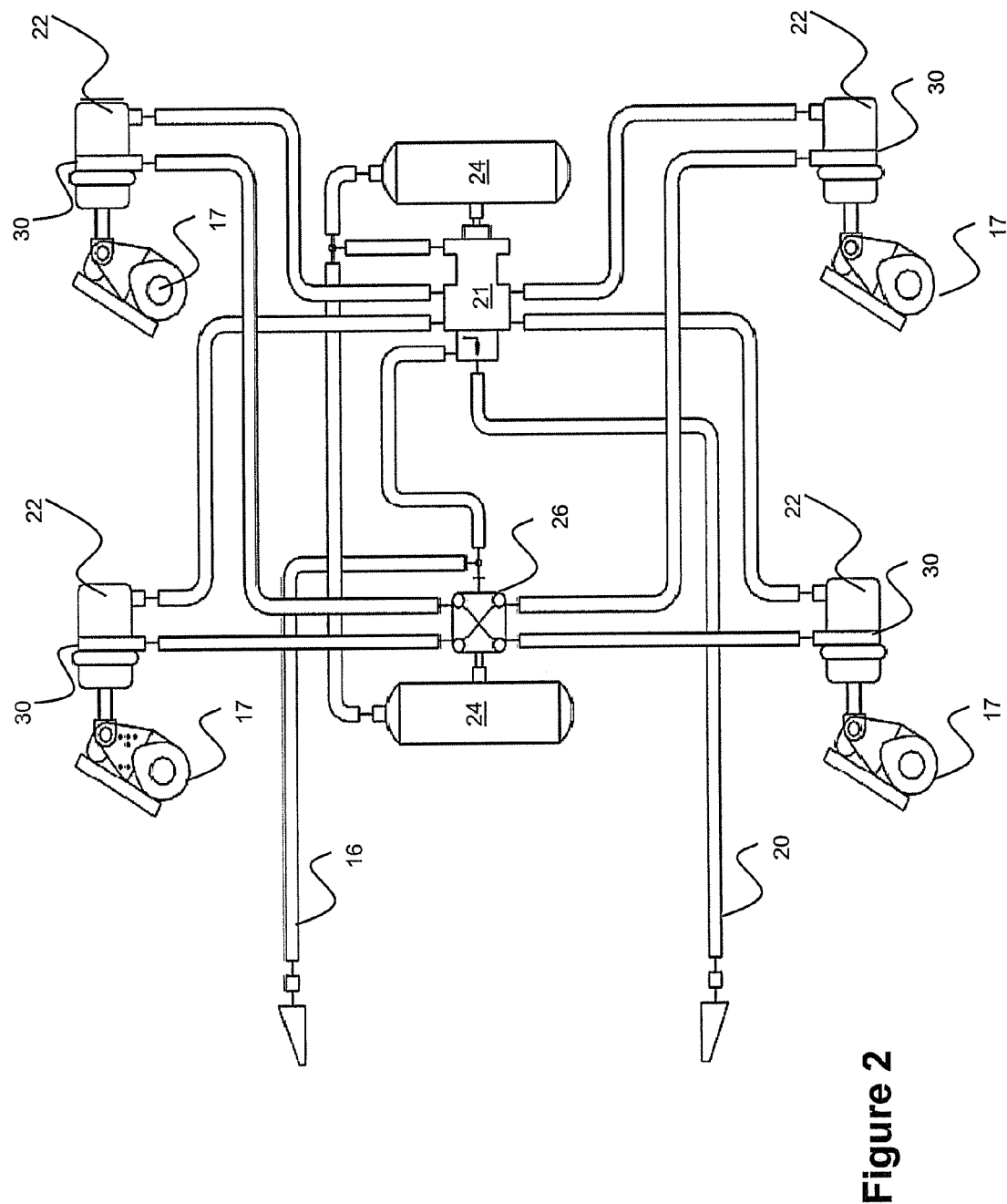
FIG. 2 is a schematic illustration of a prior art trailer brake system.
Figure 12:
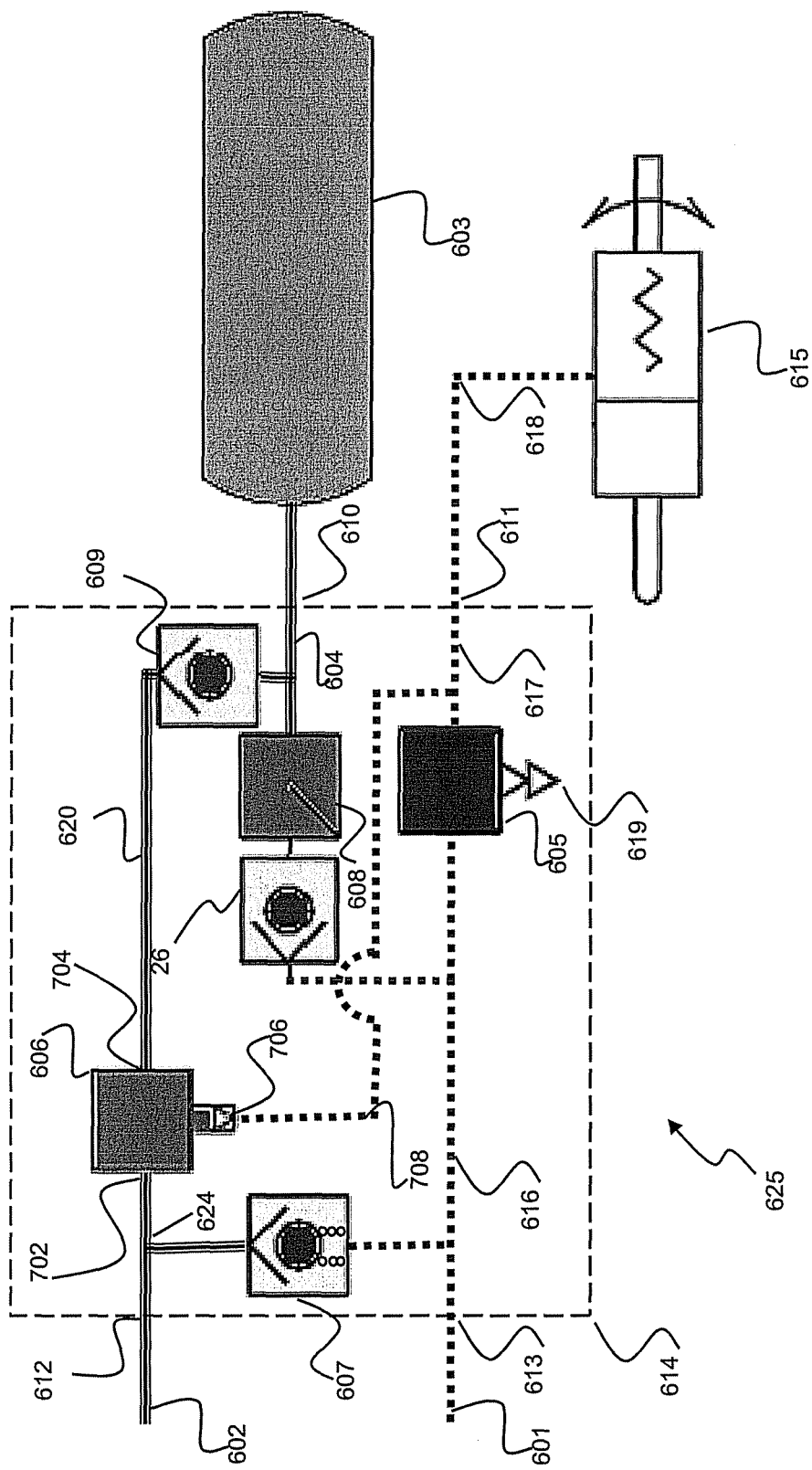
FIG. 12 illustrates the fluid circuit of FIG. 6 where the fluid circuit is operating to prevent brake compounding and when a residual service pressure is below a predetermined threshold value P3.
Figure 13:
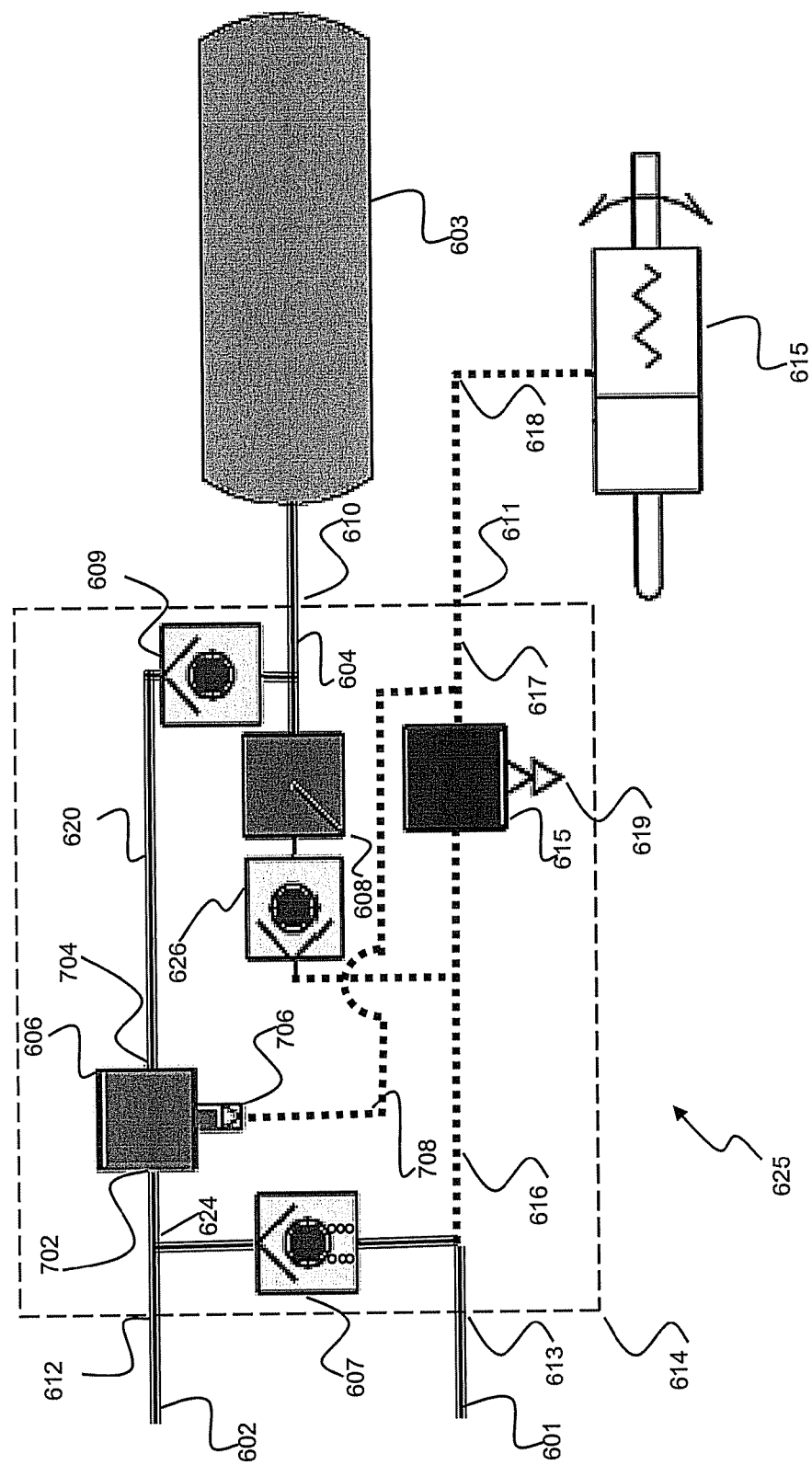
FIG. 13 illustrates the fluid circuit of FIG. 6 where the fluid circuit is operating to prevent brake compounding and when a residual service pressure is above the predetermined threshold value P3.

FIGS. 12 and 13 illustrate an anti-compounding feature of the fluid circuit 625. Compounding of the brake(s) occurs when both the spring brake chamber and the service brake chamber apply the brakes. This increase in force applied to the brakes can damage the brakes. Referring to FIG. 1, compounding could possibly occur in prior art systems occur when the trailer supply valve 18 is positioned (typically pulled out) to apply the parking brakes and the brake pedal 14 is depressed. A fixed volume of air can be trapped in the passage 624 from the service line 602 when this situation occurs. In FIG. 12, the reservoir 603 is empty and the pressure in the passage 624 from the service line 602 is less than a predetermined pressure P3 needed to open the check valve 607. For example, the predetermined pressure P3 may be approximately 20 psi. In this situation, the check valve 607 stays closed and the pressure or "slug" of air in the passage 624 will be directed to the reservoir 603 to prevent compounding of the brakes.

In FIG. 12, the reservoir 603 and the pressure in the passage 624 from the service line 602 are greater than the predetermined pressure P3. As a result, the check valve 607 opens. The pressure or "slug" of air in the passage 624 will be directed out the supply line 601 that is opened by the trailer supply valve 18 (FIG. 1) to prevent compounding of the brakes.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A valve assembly comprising:
a body having a service inlet, a supply inlet, a reservoir outlet, and a spring brake outlet; and
a plurality of valves disposed in the body configured to route pressurized air at the service inlet to the reservoir outlet and simultaneously route pressurized air at the supply inlet to the spring brake outlet wherein the service inlet is configured to receive an input selectable from a plurality of sources and pressurized air at the spring brake outlet is less than a first predetermined threshold pressure and the plurality of valves are configured to route pressurized air to the reservoir outlet from the service inlet in response to the input at the service inlet wherein the pressurized air at the spring brake outlet is greater than a second predetermined threshold pressure and the plurality of valves are configured to simultaneously route pressurized air at the supply inlet to the spring brake outlet and the reservoir outlet.

2. The assembly of claim 1 wherein the plurality of sources is selectable by a user.

3. The valve assembly of claim 1 wherein the input is a pressure signal.

4. The valve assembly of claim 1 wherein the second predetermined threshold pressure is greater than the first predetermined threshold pressure.

5. The valve assembly of claim 1 wherein the plurality of valves comprises a pressure protection valve configured to route pressurized air to the reservoir outlet when the spring brake outlet is greater than the second predetermined threshold pressure.

6. The valve assembly of claim 1 wherein the plurality of valves comprises a check valve configured to inhibit fluid flow from the supply inlet to the reservoir outlet when a pressure in the spring brake outlet is less than or equal to the second predetermined threshold pressure and to allow fluid flow from the supply inlet to the reservoir outlet when a pressure in the spring brake outlet is greater than the second predetermined threshold pressure.

7. The valve assembly of claim 1 wherein the plurality of valves comprises an inversion valve for switching between routing pressurized air at the service inlet to the reservoir outlet and routing pressurized air at the supply inlet to the spring brake outlet.

8. A valve assembly for filling a chamber of a trailer spring brake and a trailer reservoir with air supplied by a tractor comprising:
a body having a service line inlet configured to be coupled to a pressurized service line of a tractor, a supply line inlet configured to be coupled to a pressurized supply line of the tractor, a reservoir outlet configured to be coupled to a trailer reservoir, and a spring brake outlet configured to be coupled to a spring brake chamber; and
a plurality of valves disposed in the body that are configured to route pressurized air from the service line inlet to the reservoir outlet in response to air pressure at the spring brake outlet and simultaneously route pressurized air at the supply inlet to the spring brake outlet wherein a pressure of the air at the spring brake outlet is less than a first predetermined threshold pressure and the plurality of valves are configured to route pressurized air at the service line inlet to the reservoir outlet and wherein the pressure of the air at the spring brake outlet is greater than a second predetermined threshold pressure and the plurality of valves are configured to route pressurized air at the supply line inlet simultaneously to the reservoir outlet and the spring brake outlet.

9. The valve assembly of claim 8 wherein the second predetermined threshold pressure is greater than the first predetermined threshold pressure.

10. A trailer spring brake valve assembly comprising:
a housing that includes:
a service line inlet configured to be coupled to a pressurized service line of a tractor;
a supply line inlet configured to be coupled to a pressurized supply line of a tractor;
a reservoir outlet configured to be coupled to a trailer reservoir;
a spring brake outlet configured to be coupled to a spring brake chamber;
a first reservoir passage in fluid communication with the service line inlet and the reservoir outlet;
a spring brake passage in fluid communication with the supply line inlet and the spring brake outlet;
a second reservoir passage in fluid communication with the spring brake passage and the reservoir outlet;
a prioritization valve disposed in the housing in line with the first reservoir passage, wherein the prioritization valve has a sensing port in fluid communication with the spring brake passage, wherein the prioritization valve is configured such that the prioritization valve is closed to inhibit fluid flow from the service line inlet to the reservoir outlet through the first reservoir passage when a pressure at the sensing port is greater than or equal to a first predetermined threshold pressure and the prioritization valve is opened to allow fluid flow from the service line inlet to the reservoir outlet through the first reservoir passage when a pressure at the sensing port is less than the first predetermined threshold pressure.

11. The valve assembly of claim 10 further comprising a check valve in line with the second reservoir passage configured to inhibit fluid flow through the second reservoir passage to the reservoir outlet when a pressure in the spring brake passage is less than or equal to a second predetermined threshold pressure and to allow fluid flow through the second reservoir passage to the reservoir outlet when a pressure in the spring brake passage is greater than the second predetermined threshold pressure.

12. The valve assembly of claim 11 wherein the second predetermined threshold pressure is greater than the first predetermined pressure.

* * * * *